[12] United States Patent
Shyu et al.

(10) Patent No.: US 8,023,203 B2
(45) Date of Patent: Sep. 20, 2011

(54) MINIATURE THREE-PIECE OPTICAL IMAGING LENS WITH SHORT BACK FOCAL LENGTH

(75) Inventors: San-Woei Shyu, Taipei (TW); Bo-Yuan Shih, Taipei (TW); Ming-Che Kuo, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/819,040

(22) Filed: Jun. 18, 2010

(65) Prior Publication Data

US 2010/0321795 A1 Dec. 23, 2010

(30) Foreign Application Priority Data

Jun. 19, 2009 (TW) ................. 98120738 A

(51) Int. Cl.
G02B 13/18 (2006.01)
G02B 3/02 (2006.01)
G02B 9/12 (2006.01)
(52) U.S. Cl. ....................... 359/716; 359/784
(58) Field of Classification Search ............ 359/784, 359/716, 740, 748, 708
See application file for complete search history.

(56) References Cited

U.S. PATENT DOCUMENTS 7,460,314 B2 * 12/2008 Shyu et al. .......... 359/784

FOREIGN PATENT DOCUMENTS

| CN | 1670560 A | 9/2005 |
| CN | 1873460 A | 12/2006 |
| CN | 1945372 A | 4/2007 |
| EP | 1840618 A1 | 10/2007 |
| EP | 1942363 A2 | 7/2008 |
| JP | 2004-163786 | 6/2004 |
| JP | 2005-338234 | 12/2005 |
| JP | 2005-352317 | 12/2005 |
| JP | 2006-098976 | 4/2006 |
| JP | 2007-010773 | 1/2007 |
| JP | 2007-047513 | 2/2007 |
| JP | 2007-094113 | 4/2007 |
| JP | 2007-121820 | 5/2007 |

(Continued)

*Primary Examiner* — Alicia M Harrington
(74) *Attorney, Agent, or Firm* — Muncy, Geissler, Olds & Lowe, PLLC

(57) ABSTRACT

An miniature three-piece optical imaging lens with short back focal length, along an optical axis from the object side to the image side including: a first lens of positive refractive power that is a meniscus aspherical lens having a convex surface on the object side, an aperture stop, a second lens of negative refractive power that is a meniscus aspherical lens having a convex surface on the image side, a third lens of negative refractive power that is an aspherical lens whose center is on the optical axis, while on the lens center the convex surface is on the object side and the concave surface is on the image side. Moreover, from the center of the third lens element toward the edge, the refractive power changes from negative power, through an inflection point, to positive power. Furthermore, the optical imaging lens further satisfies conditions:

$$0.25 \leq \frac{bf}{TL} \leq 0.4$$

wherein bf is back focal length, TL is total distance on the optical axis from the object side of the first lens to the image plane. Thereby, the imaging lens achieves effective aberration correction, high resolution and minimum total length.

6 Claims, 9 Drawing Sheets

FOREIGN PATENT DOCUMENTS

| | | |
|---|---|---|
| JP | 2008-180744 | 8/2008 |
| JP | 2008-233222 | 10/2008 |
| JP | 2008-276200 | 11/2008 |
| TW | 200639432 | 5/2005 |
| TW | M343167 | 2/2008 |
| WO | WO-2007/039980 A1 | 4/2007 |

* cited by examiner

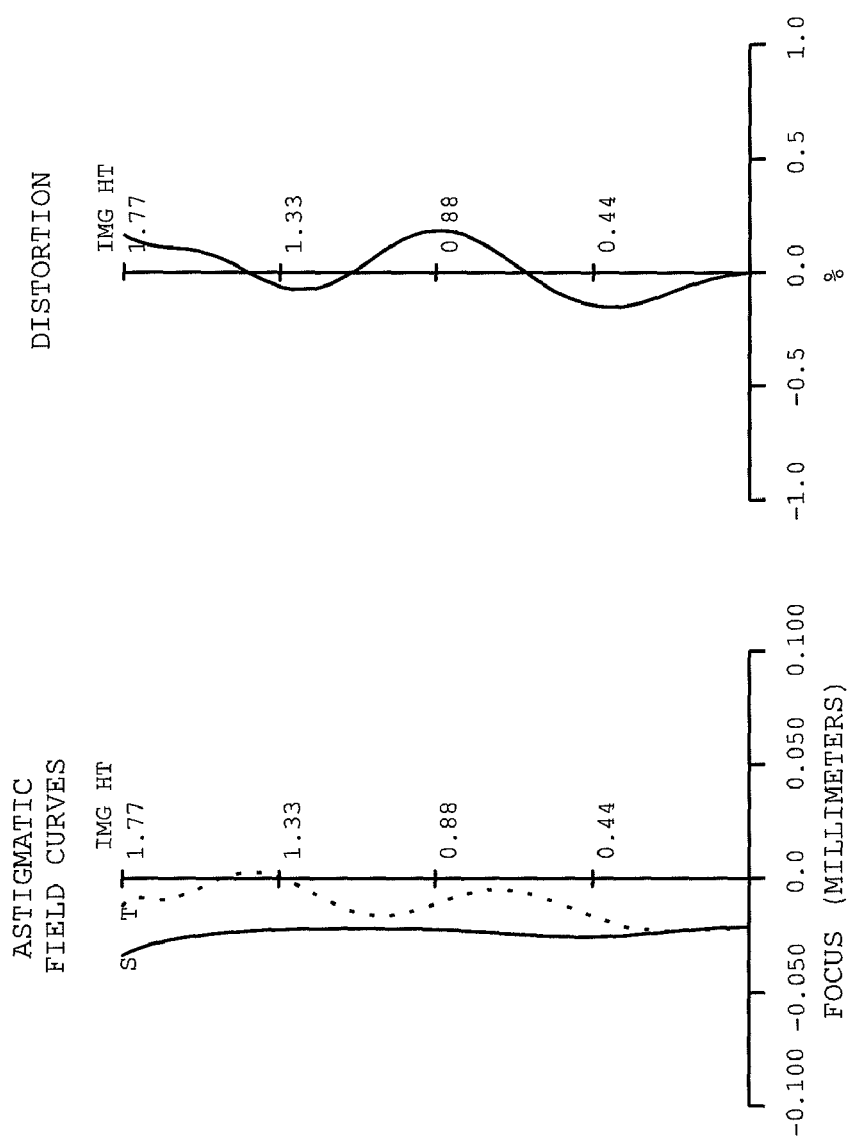

MINIATURE THREE-PIECE OPTICAL IMAGING LENS WITH SHORT BACK FOCAL LENGTH

BACKGROUND OF THE INVENTION

The present invention relates to an imaging lens, and more particularly to an optical imaging lens for mobile phones or image sensors such as CCD (Charge Coupled Device) or CMOS (Complementary Metal Oxide Semiconductor) formed by three elements of lens with features of short back focal length, short overall (total) length and low cost.

Due to fast development of modern technology, electronics have becoming more compact and multifunctional. A lot of electronics such as digital cameras, PC (personal computer) cameras, network cameras, mobile phones, even personal digital assistants are equipped with image capturing devices. For convenience of easy-carrying and requirement of humanization, the image capturing devices requires good image quality, compact volume and low cost. Especially for applications on mobile phones, the above requirements are getting more important.

Due to many materials available for making the lens and better correcting effect for color aberration, conventional spherical ground glass lenses have been widely adopted in optical industry field. However, the spherical ground glass lenses have poor effect on correction of spherical aberration and astigmatic aberration when being applied under condition of a smaller f number and wide angle of field. In order to improve above disadvantages of the conventional spherical ground glass lenses, the image capturing devices available now use aspherical plastic lenses or aspherical molded glass lenses to replace conventional spherical ground glass lenses for better imaging quality. For example, refer to the lenses disclosed the optical imaging lens are formed by three lens elements, such as US2007/0091457, U.S. Pat. Nos. 6,515,809, 7,262,925, US 2007/0195432, US2005/0128334, JP 2007-121820, JP2005-352317, JP 2004-163786, JP 2007-094113, JP 2005-338234, JP 2007-047513, and JP 2006-098976 etc. The differences among embodiments of above patents are in components or combinations of components. For example, the three lens elements are all in meniscus shape or the first and the second lens elements are meniscus while the third lens element is in plano-concave shape or plano-convex shape. Or the convex surface/concave surface of the first/second/third lens elements can be arranged on the object/image side. Or the refractive power of the three lens elements may vary. For example, refractive power of the first, the second and the third lens elements are respectively positive, negative, positive or positive, positive, negative in sequence. Moreover, the three lens set/lens element respectively satisfy various optical parameters such as f (effective focal length of the whole optical imaging lens), d (distance between the object side and the image side of the first lens element), $R_{11}$ (radius of curvature of the object side of the first lens element), $R_{12}$ (radius of curvature of the image side of the first lens element), $f_1$ (effective focal length of the first lens element), $f_2$ (effective focal length of the second lens element), and $f_3$ (effective focal length of the third lens element), as the embodiment shown in Japanese patent No. 3717488. Thus it is learned that the design of a three-element type optical imaging lens depends on optical requirements that result from combinations of various lens in different shapes and with different functions.

In recent years, the optical imaging lens are getting more compact with shorter focal length and better aberration correction for being applied to various portable electronics such as cameras, camera phones, and PDA. In different designs of compact three-element type optical imaging lens, the lens having a first lens element with positive refractive power, a second lens element with negative refractive power, a third lens element with an inflection point that changes the refractive power (also called M-shaped lens) achieves most compact requirement. As to different imaging method, the lens having a first lens element with positive refractive power, a second lens element with negative refractive power, a third M-shaped lens element with positive refractive power are disclosed in EP1830210, JP2008-139853, JP2006-178328, U.S. Pat. Nos. 7,397,613, 7,486,328, 7,423,817, 7,468,847, 7,515,358, US2007/0195426, US2007/0217034, US2007/0229986, US2008/0239510, TWM343167, TW200639432, CN1670560, CN1873460, and so on. The lens having a first lens element with positive refractive power, a second lens element with negative refractive power, a third M-shaped lens element with negative refractive power are disclosed in EP1840618, EP1942363, U.S. Pat. Nos. 7,460,315, 7,460,314, 7,450,323, 7,511,899, US2007/0229987, US2008/0225401, US2008/0266679, US2007/0195426, JP3816093, JP2008-276200, JP2008-233222, JP2007-010773, WO2007039980, CN1945372, and so on.

Applying for optical imaging lens, especially an optical imaging lens for mobile phones and network camera, the users are in urgent need of the imaging lens system with small effective radius, short overall length, short back focal length, and good aberration correction. However, in order to achieve the above-mentioned needs, the prior arts utilize different composition of lenses, different shapes of lenses or different related optical parameters. In order to achieve the convenience for designing and manufacturing the lens, this present invention provides an optical imaging lens with short back focal length, especially utilize a second lens with a relative longer focal length so as to decrease the back focal length effectively for being applied to mobile phones or imaging system more easily.

SUMMARY OF THE INVENTION

Therefore it is a primary object of the present invention to provide a miniature three-piece optical imaging lens with short back focal length, along an optical axis from the object side to the image side including: a first lens of positive refractive power that is a meniscus aspherical lens having a convex surface on the object side, an aperture stop, a second lens of negative refractive power that is a meniscus aspherical lens having a convex surface on the image side, a third lens of negative refractive power that is an aspherical lens whose center is on the optical axis while on the lens center, the convex surface is on the object side and the concave surface is on the image side. Moreover, from the center of the third lens element toward the edge, the refractive power changes from negative power, through an inflection point, to positive power. Furthermore, the second lens has a relative longer focal length so as to decrease the back focal length. The optical imaging lens further satisfies following conditions:

$$0.25 \le \frac{bf}{TL} \le 0.4 \quad (1)$$

$$0.001 \le \frac{\Delta}{f} \le 0.006 \quad (2)$$

$$0.38 \le \frac{H_-}{H_t} \le 0.7 \quad (3)$$

$$-0.12 \leq \frac{f_1}{f_2} \leq -0.01 \quad (4)$$

$$0.25 \leq \frac{d_3 + d_5 + d_7 + d_9}{f} \leq 0.5 \quad (5)$$

$$0.7 \leq \frac{f_1}{f} \leq 1.2 \quad (6)$$

$$-0.2 \leq \frac{R_{21} - R_{22}}{R_{21} + R_{22}} \leq -0.06 \quad (7)$$

wherein f is effective focal length of the optical imaging lens, bf is back focal length, TL is total distance on the optical axis from the object side 11 of the first lens to the image plane, Δ is the absolute value of longitudinal chromatic aberrations at Fraunhofer F curve and C curve wavelengths, H is perpendicular distance from the inflection point on the image side of the third lens to its intersection point of the optical axis, $H_t$ is perpendicular distance from the maximum optical effective point on the image side of the third lens to the optical axis (see FIG. 2), $f_1$ is effective focal length of the first lens, $f_2$ is effective focal length of the second lens, $d_3$ is distance on the optical axis from the image side 12 of the first lens L1 to the object side 21 of the second lens L1, $d_5$ is distance on the optical axis from the image side 22 of the second lens L2 to the object side 31 of the third lens L3, $d_7$ is distance on the optical axis from the image side 32 of the third lens L3 to the object side of the IR cut-off filter 4, $d_9$ is distance on the optical axis from the image side of the IR cut-off filter 4 to the image plane of image sensor 5, $R_{21}$ is radius of curvature of the object side 21 of the second lens L2 and $R_{22}$ is radius of curvature of the image side 22 of the second lens L2. Thereby, the imaging lens of the present invention achieves effective aberration correction, high resolution and minimum total length. Therefore, the imaging lens with smaller volume, lower cost has broader applications.

BRIEF DESCRIPTION OF THE DRAWINGS

FIG. 6 shows field curvature of an image of the second embodiment in FIG. 5 according to the present invention;

FIG. 7 shows distortion of an image of an embodiment in FIG. 5 according to the present invention;

DETAILED DESCRIPTION OF THE PREFERRED EMBODIMENT

Figure 1:
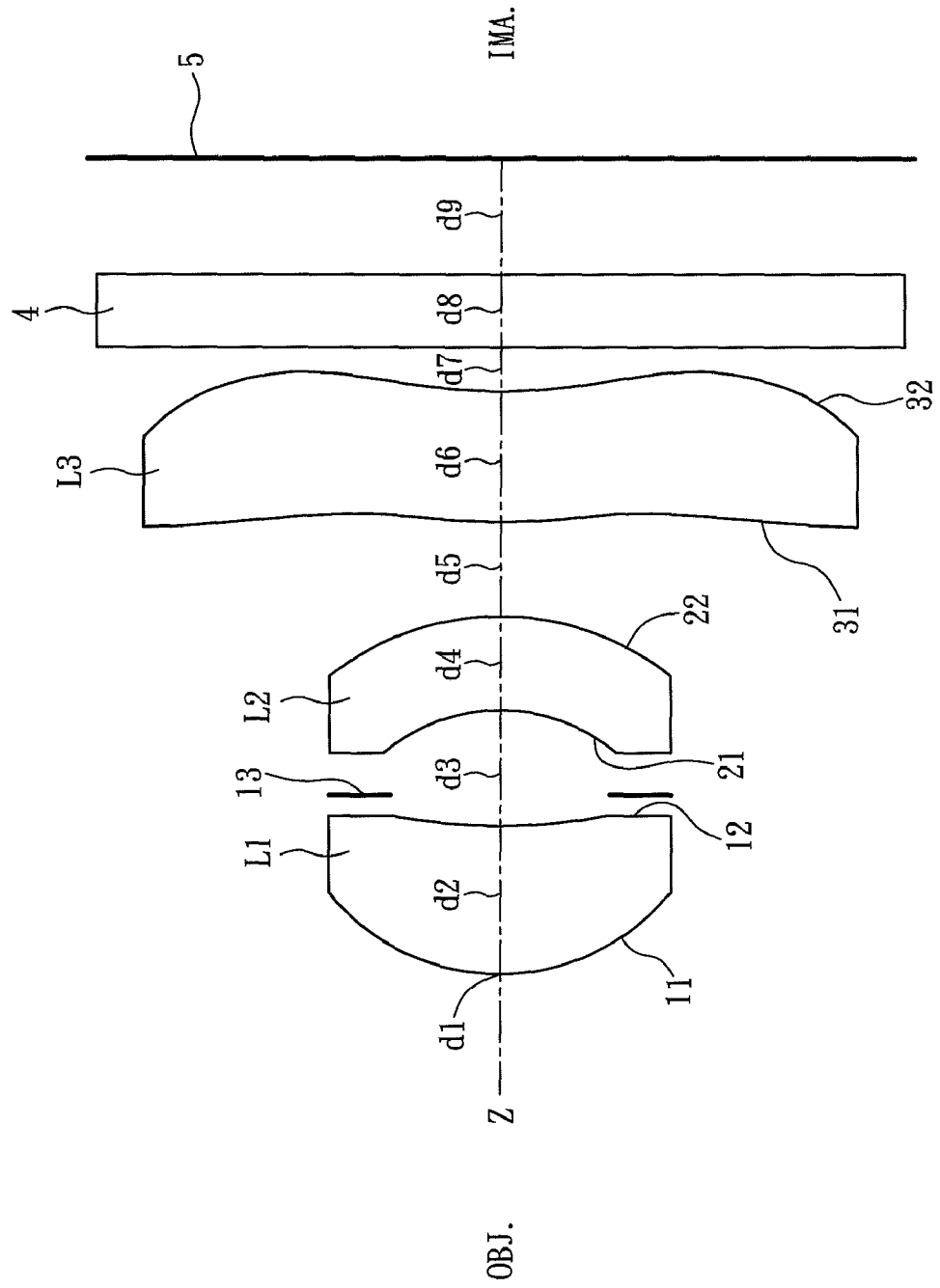
FIG. 1 is a schematic drawing of an optical structure of the first embodiment according to the present invention.

Refer to FIG. 1, a miniature three-piece optical imaging lens with short back focal length of the present invention includes a first lens L1, an aperture stop 13, a second lens L2, a third lens L3, an IR(infrared) cut-off filter 4 and an image sensor 5 along the optical axis Z, in order from the object side to the image side. While capturing image, light from the object passes the first lens L1, the second lens L2, the third lens L3 and the IR cut-off filter 4, then the light is detected by the image sensor 5, and an image is formed.

The first lens L1 with positive refractive power is a meniscus aspherical lens whose object side 11 (the side facing the object) is a convex surface and an image side 12 (the side facing the image) thereof is a concave surface while at least one of the object side (convex surface) 11 and the image side (concave surface) 12 is an aspherical surface or both sides 11, 12 are aspherical. The first lens L1 is made from glass or plastic whose refractive index $N_{d1}$ is larger than 1.5 and the abbe number $v_{d1}$ is larger than 50.

The second lens L2 with negative refractive power is a meniscus aspherical lens made from glass or plastic whose refractive index $N_{d2}$ is larger than 1.56 and the abbe number $v_{d2}$ is larger than 25. The second lens L2 includes an object side 21 (the side facing the object) that is a concave surface and an image side 22 (the side facing the image) thereof is a convex surface while at least one of the concave surface 21 and the convex surface 22 is an aspherical surface or both sides 21, 22 are aspherical. In order to achieve the convenience for designing and manufacturing the lens, the second lens has a relative longer focal length ora small absolute number of equation (4) to decrease the back focal length.

The third lens L3 is an aspherical lens with the refractive power changing gradually from negative to positive refractive power and is made from glass or plastic whose refractive index $N_{d3}$ is larger than 1.5 and the abbe number $V_{d2}$ is larger than 55. The object side 31 on the lens center of the third lens L3 is a convex surface while an image side 32 on the lens center of the third lens L3 is a concave surface. From the center of the lens L3 toward the edge, the refractive power changes from negative to positive, through an inflection point.

Figure 2:
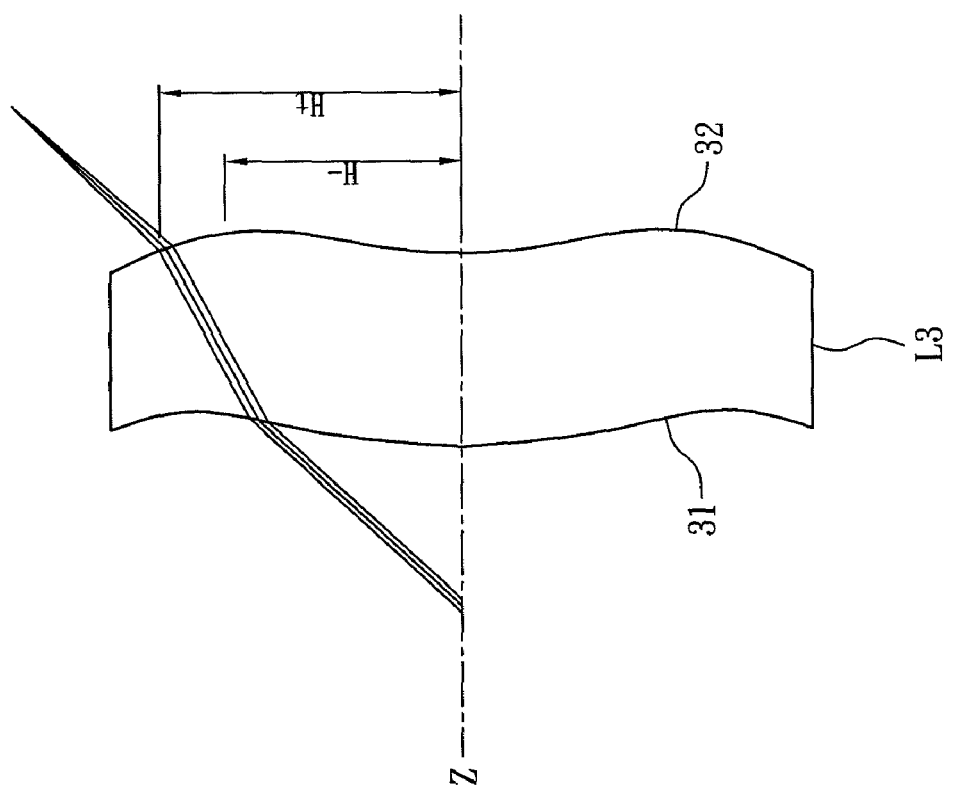
FIG. 2 is a side view of a third lens with the inflection point of an embodiment according to the present invention.

As shown in FIG. 2, a cross section of the third lens L3 shows that the center is concave while the neighboring of center is convex, so called as M-shape. Therefore, on the wavelike image side 32 and the object side 31 within the effective optical surface, the curvature changes from a concave/convex surface of the lens center to the convex/concave surface of the lens peripheral and the inflection point formed between the conversion of the refractive power. When a tangent line passes through the inflection point and crosses the optical axis vertically, the distance from the inflection point to the optical axis is the height of the lens with negative refractive power and is labeled as H as shown in FIG. 2. That's the distance from the inflection point of the third lens element L3 to the optical axis Z. The distance from the maximum optical effective point of the third lens L3 to the optical axis Z is labeled as $H_t$. The ratio of H to $H_t$ represents the area changing from negative refractive power to positive refractive power. In order to have better image, the preferred ratio is between 38% and 70%, satisfying the equation (3).

The IR cut-off filter 4 is a lens or a film processed by coating technology for filtering infrared light. The image sensor 5 is a CCD (Charge Coupled Device) or CMOS (Complementary Metal Oxide Semiconductor). The aperture stop 13 is arranged between the first lens L1 and the second lens L2, as shown in FIG. 1, or is against on the image side (concave surface) 12 of the first lens L1.

The three-piece optical imaging lens with short back focal length of the present invention satisfies following equations (1) to (7):

$$0.25 \leq \frac{bf}{TL} \leq 0.4 \quad (1)$$

$$0.001 \leq \frac{\Delta}{f} \leq 0.006 \quad (2)$$

$$0.38 \leq \frac{H}{H_t} \leq 0.7 \quad (3)$$

$$-0.12 \leq \frac{f_1}{f_2} \leq -0.01 \quad (4)$$

$$0.25 \leq \frac{d_3 + d_5 + d_7 + d_9}{f} \leq 0.5 \quad (5)$$

$$0.7 \leq \frac{f_1}{f} \leq 1.2 \quad (6)$$

$$-0.2 \leq \frac{R_{21} - R_{22}}{R_{21} + R_{22}} \leq -0.06 \quad (7)$$

In order to achieve the primary object of the present invention, the both optical surfaces of the first lens L1, the second lens L2, or the third lens L3 are preferred, but not limited, to be designed to be aspherical surfaces while the Aspherical Surface Formula is as equation (8):

$$Z = \frac{ch^2}{1 + \sqrt{(1 - (1 + K)c^2h^2)}} + A_4h^4 + A_6h^6 + A_8h^8 + A_{10}h^{10} + A_{12}h^{12} + A_{14}h^{14} \quad (8)$$

wherein c is a radius of curvature,
h represents height of lens,
K is a conic constant,
$A_4, A_6, A_8, A_{10}, A_{12}, A_{14}$ respectively are 4th, 6th, 8th, 10th, 12th, 14th order aspherical coefficient.

The first lens L1, the second lens L2 and the third lens L3 can be made from glass or plastic. In accordance with above structure, the aberration is effectively corrected and the main incident light angle is reduced so that the lens has high resolution and minimized total length and back focal length so as to make the imaging lens with compact volume and lower cost to improve the applications of the lens.

The First Embodiment

Figures 3, 4:
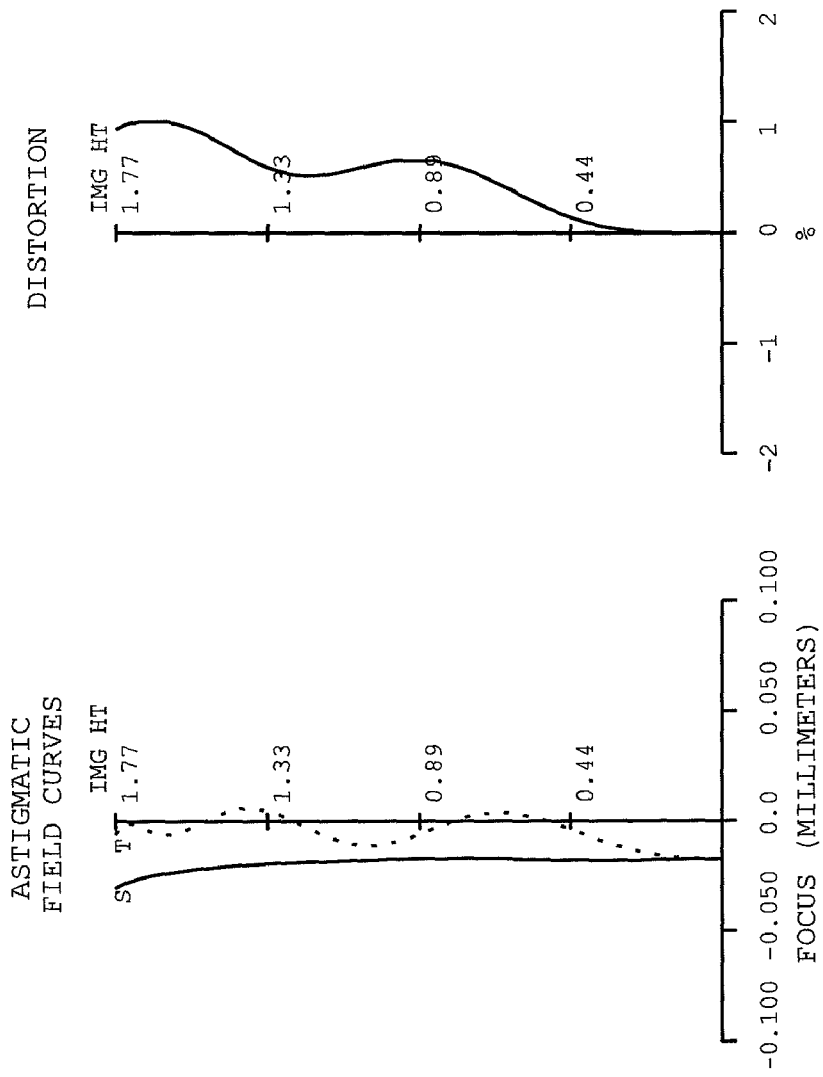
FIG. 3 shows field curvature of an image of the first embodiment in FIG. 1 according to the present invention.
FIG. 4 shows distortion of an image of the first embodiment in FIG. 1 according to the present invention.

Refer from FIG. 1 and FIG. 3, 4 showing this embodiment. In order from the object side to the image side, the optical surface numbers, the radius of curvature R (mm) of each optical surface on the optical axis, the on-axis surface spacing d (mm) of each optical surface on the optical axis, the refractive index $N_d$ of each lens, and the Abbe's number $v_d$ of each lens is listing in Table 1.

TABLE 1

| Fno = 2.8 f = 2.7468 FOV = 64.0 | | | | |
|---|---|---|---|---|
| Surface No. | R | d (mm) | Nd | vd |
| 1 OBJ | ∞ | 0 | | |
| 2 R1* | 0.8854 | 0.596 | 1.544 | 56.1 |
| 3 R2* | 2.4738 | 0.441 | | |
| STOP | | | | |
| 4 R3* | −0.7594 | 0.388 | 1.585 | 30 |
| 5 R4* | −0.93317 | 0.324 | | |
| 6 R5* | 2.7416 | 0.54 | 1.531 | 56 |
| 7 R6* | 1.7544 | 0.178 | | |
| 8 IR | ∞ | 0.3 | | |
| 9 | | 0.329 | | |
| 10 IMAGE | ∞ | | | |

*Aspheric

The aspheric coefficients of equation (8) of each optical surface are listing in Table 2.

TABLE 2

| | K | A4 | A6 | A8 | A10 | A12 |
|---|---|---|---|---|---|---|
| R1* | −1.0201E+00 | 1.9252E−01 | 2.4606E−01 | −2.4230E−01 | 8.5688E−01 | −5.1217E−01 |
| R2* | −5.0000E+01 | 6.6491E−01 | −6.0390E+00 | 5.1240E+01 | −2.3191E+02 | 3.9898E+02 |
| R3* | −6.9428E−01 | −4.9561E−01 | −1.7596E+00 | 1.5883E+01 | −6.2732E+01 | 5.8837E+01 |
| R4* | −1.1693E+00 | −2.9765E−01 | −4.3670E−02 | 3.2347E+00 | −4.9671E+00 | 2.9836E+00 |
| R5* | −2.0737E+01 | −4.5772E−01 | 6.3911E−01 | −4.3094E−01 | 1.4724E−01 | −2.0211E+02 |
| R6* | −1.8458E+01 | −1.6060E−01 | −2.0228E−03 | 5.4425E−02 | −3.0104E−02 | 4.9284E−03 |

In this embodiment, the first lens L1 is made from plastic that has the refractive index $N_{d1}$ of 1.54, and the Abbe's number $v_{d1}$ of 56.1, the second lens L2 is made from plastic that has the refractive index $N_{d2}$ of 1.58 and the Abbe's number $V_{d2}$ of 30, and the third lens L3 is made from glass that has the refractive index $N_{d3}$ of 1.53 and the Abbe's number $V_{d3}$ of 56 while the IR cut-off filter 4 is made from BSC7 glass.

The systematic effective focal length f of this embodiment is 2.7468 mm while the focal length $f_1$ of the first lens L1 is 2.2384 mm, the focal length $f_2$ of the second lens L2 is −41.4011 mm, and the focal length $f_3$ of the third lens L3 is −11.3204 mm. The inflection point on the image side 32 of the third lens L3 is positioned at 1.42 mm. That means these parameters listing in Table 3 satisfy the equation (1) to equation (7):

TABLE 3

| | |
|---|---|
| $\frac{bf}{TL} =$ | 0.2965 |
| $\frac{\Delta}{f} =$ | 0.0045 |
| $\frac{H_-}{H_t} =$ | 0.4057 |

TABLE 3-continued

| | |
|---|---|
| $\dfrac{f_1}{f_2} =$ | -0.0541 |
| $\dfrac{d_3 + d_5 + d_7 + d_9}{f} =$ | 0.3982 |
| $\dfrac{f_1}{f} =$ | 0.8149 |
| $\dfrac{R_{21} - R_{22}}{R_{21} + R_{22}} =$ | -0.1019 |

In this embodiment, the total length TL=3.0952 mm, and back focal length bf=0.92 mm. Thus, the imaging lens achieves effective aberration correction, minimum length and short back focal length.

The Second Embodiment

Figure 5:
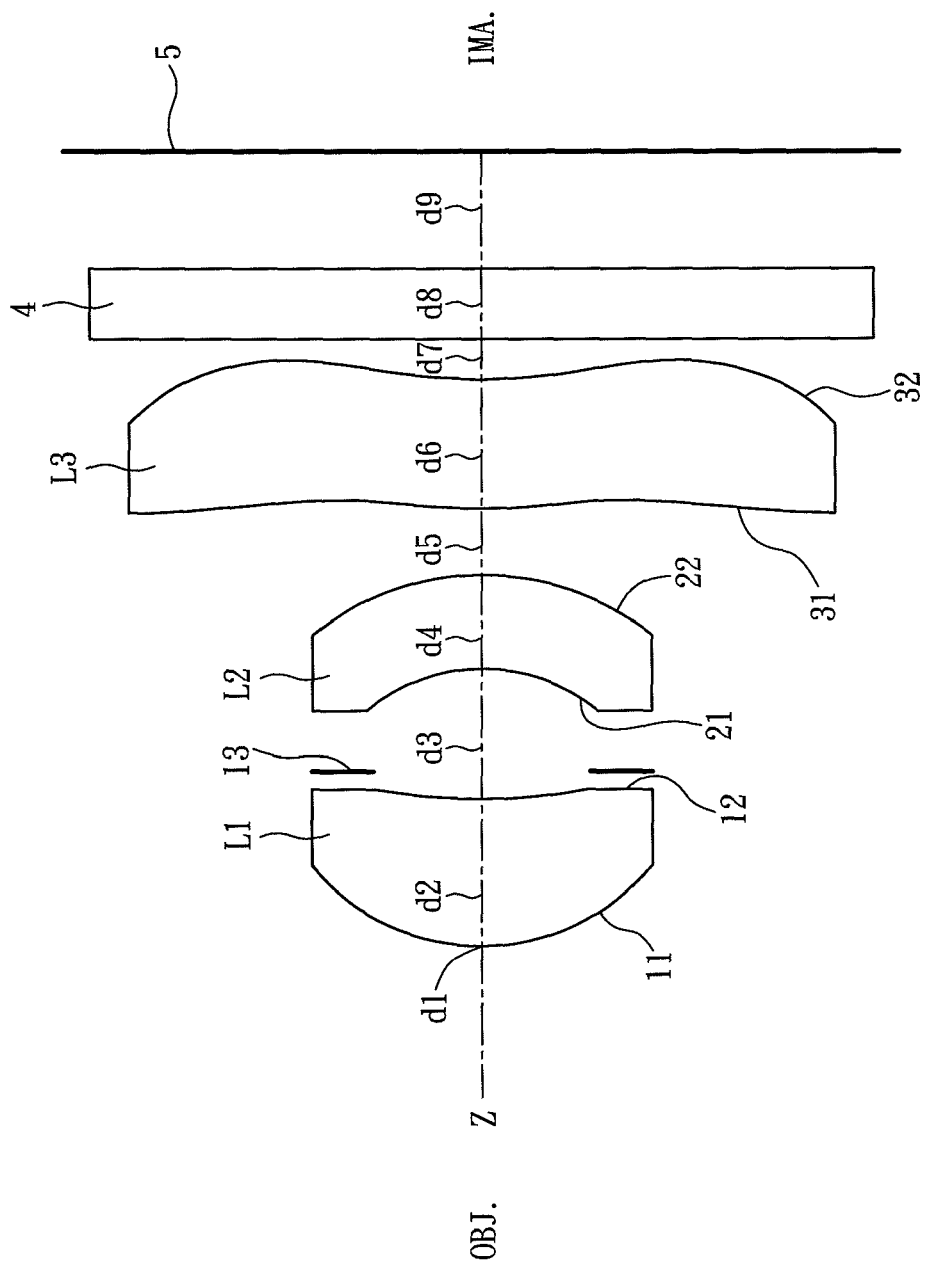
FIG. 5 is a schematic drawing of an optical structure of the second embodiment according to the present invention.

Refer FIG. 5-7, Table 4 and Table 5, the symbols thereof are the same as those of the above first embodiment.

TABLE 4

Fno = 2.8 f = 2.7706 FOV = 63.8

| Surface No. | R | d (mm) | Nd | vd |
|---|---|---|---|---|
| 1 OBJ | ∞ | 0 | | |
| 2 R1* | 0.8995 | 0.587 | 1.544 | 56.1 |
| 3 R2* | 2.4942 | 0.449 | | |
| STOP | | | | |
| 4 R3* | -0.8224 | 0.371 | 1.614 | 26 |
| 5 R4* | -1.0242 | 0.371 | | |
| 6 R5* | 1.9439 | 0.506 | 1.531 | 56 |
| 7 R6* | 1.3660 | 0.162 | | |
| 8 IR | ∞ | 0.300 | | |
| 9 | | 0.284 | | |
| 10 IMAGE | ∞ | | | |

*Aspheric

TABLE 5

| | K | A4 | A6 | A8 | A10 | A12 |
|---|---|---|---|---|---|---|
| R1* | -1.0513E+00 | 1.8715E-01 | 2.3592E-01 | -1.8416E-01 | 5.4122E-01 | -1.2992E-01 |
| R2* | -5.0000E+01 | 6.3430E-01 | -5.6962E+00 | 4.9428E+01 | -2.2786E+02 | 3.9898E+02 |
| R3* | -4.9817E-01 | -5.1922E-01 | -8.4273E-01 | 8.5060E+00 | -3.9480E+01 | 5.1517E+01 |
| R4* | -5.2615E-01 | -3.1071E-01 | 2.7776E-01 | 1.6700E+00 | -2.5672E+00 | 2.1435E+00 |
| R5* | -1.0150E+01 | -5.3093E-01 | 6.5799E-01 | -4.2764E-01 | 1.4585E-01 | -2.0321E+02 |
| R6* | -1.2160E+01 | -1.8390E-01 | 2.1213E-02 | 4.0902E-02 | -2.9119E-02 | 5.4901E-03 |

In this embodiment, the first lens L1 is made from plastic that has the refractive index $N_{d1}$ of 1.54, and the Abbe's number $v_{d1}$ of 56.1, the second lens L2 is made from plastic that has the refractive index $N_{d2}$ of 1.61 and the Abbe's number $V_{d2}$ of 26, and the third lens L3 is made from plastic that has the refractive index $N_{d3}$ of 1.53 and the Abbe's number $V_{d3}$ of 56 while the IR cut-off filter 4 is made from BSC7 glass.

The effective focal length f of the lens of this embodiment is 2.77706 mm while the focal length $f_1$ of the first lens L1 is 2.2888 mm, the focal length $f_2$ of the second lens L2 is -22.6801 mm, and the focal length $f_3$ of the third lens L3 is -12.4237 mm. The inflection point on the image side 32 of the third lens L3 is positioned at 1.52 mm. That means these parameters listing in Table 6 satisfy the equation (1) to equation (7):

TABLE 6

| | |
|---|---|
| $\dfrac{bf}{TL} =$ | 0.3058 |
| $\dfrac{\Delta}{f} =$ | 0.0042 |
| $\dfrac{H}{H_r} =$ | 0.4343 |
| $\dfrac{f_1}{f_2} =$ | -0.1009 |
| $\dfrac{d_3 + d_5 + d_7 + d_9}{f} =$ | 0.3987 |
| $\dfrac{f_1}{f} =$ | 0.8261 |
| $\dfrac{R_{21} - R_{22}}{R_{21} + R_{22}} =$ | -0.1093 |

In this embodiment, the total length TL=3.0315 mm, and back focal length bf=0.93 mm. Thus, the imaging lens achieves effective aberration correction, minimum length and short back focal length.

The Third Embodiment

Figure 8:
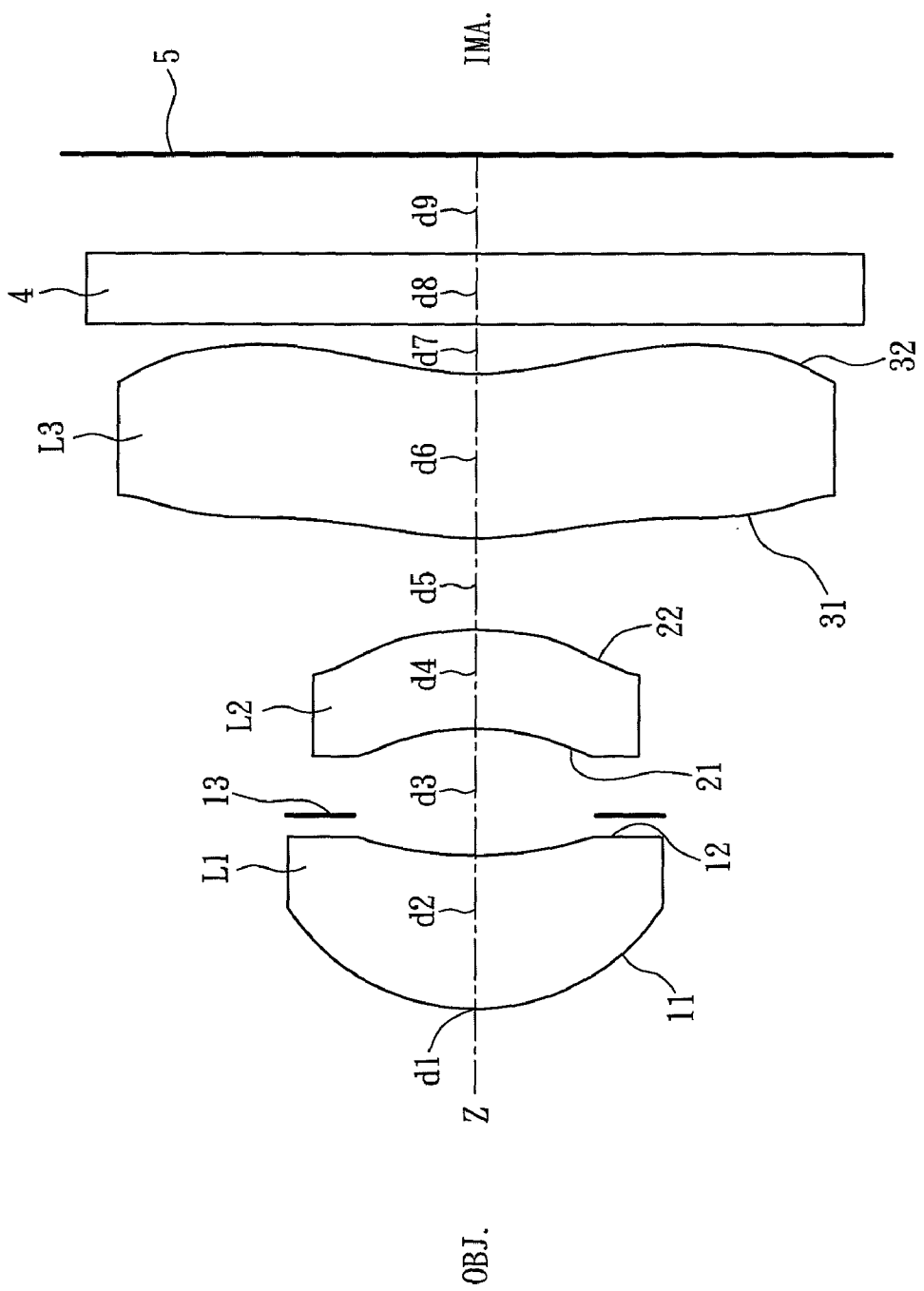
FIG. 8 is a schematic drawing of an optical structure of the third embodiment according to the present invention.
Figures 9, 10:
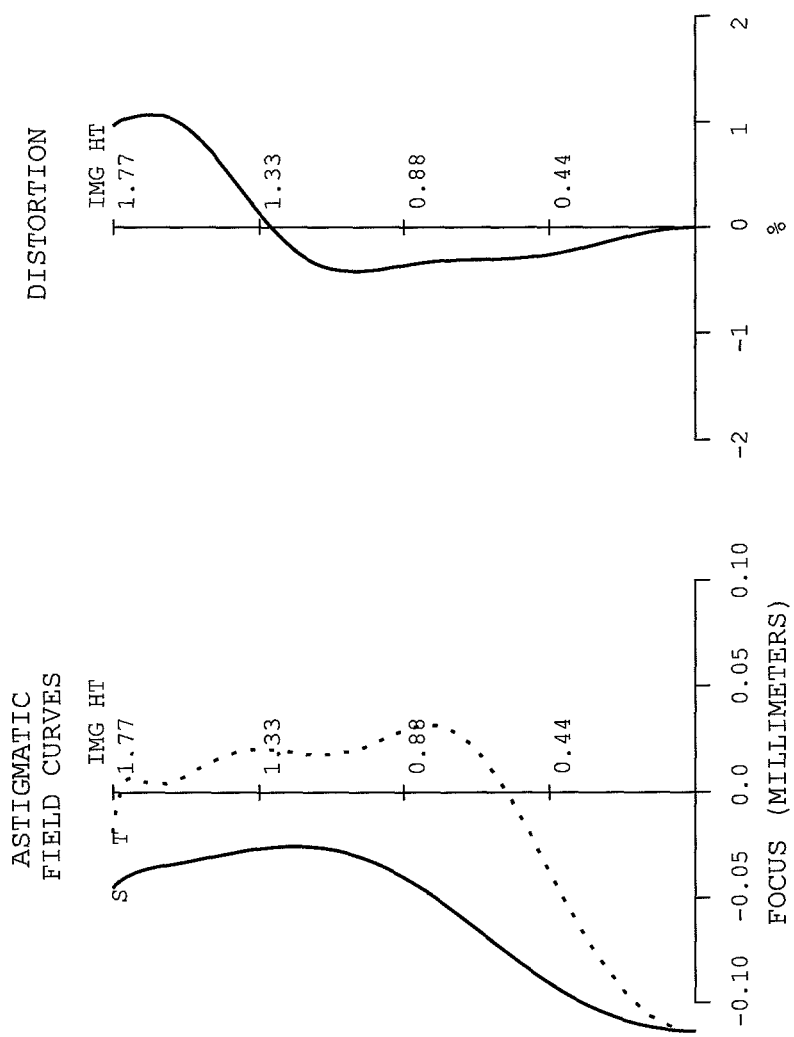
FIG. 9 shows field curvature of an image of the embodiment in FIG. 8 according to the present invention.
FIG. 10 shows distortion of an image of an embodiment in FIG. 8 according to the present invention.

Refer to FIG. 8-10, Table 7 and Table 8, the symbols thereof are the same as those of the first embodiment.

TABLE 7

Fno = 2.8 f = 2.8261 FOV = 61.3

| Surface No. | R | d (mm) | Nd | vd |
|---|---|---|---|---|
| 1 OBJ | ∞ | 0 | | |
| 2 R1* | 1.0834 | 0.672 | 1.544 | 56.1 |
| 3 R2* | 2.7382 | 0.545 | | |

TABLE 7-continued

Fno = 2.8 f = 2.8261 FOV = 61.3

| Surface No. | R | d (mm) | Nd | vd |
|---|---|---|---|---|
| STOP | | | | |
| 4 R3* | -1.0810 | 0.427 | 1.614 | 26 |
| 5 R4* | -1.2656 | 0.398 | | |
| 6 R5* | 1.4647 | 0.707 | 1.531 | 56 |
| 7 R6* | 1.1946 | 0.223 | | |
| 8 IR | ∞ | 0.300 | | |
| 9 | | 0.269 | | |
| 10 IMAGE | ∞ | | | |

*Aspheric

TABLE 8

|     | K           | A4          | A6          | A8          | A10         | A12         |
|-----|-------------|-------------|-------------|-------------|-------------|-------------|
| R1* | −1.4149E+00 | 1.5223E−01  | 2.8251E−01  | −3.6080E−01 | 3.5946E−01  | 3.4720E−01  |
| R2* | 4.6434E−01  | 6.1406E−01  | −6.9700E+00 | 5.6598E+01  | −1.9326E+02 | 2.3541E+02  |
| R3* | −1.3451E+00 | −3.4721E−01 | −8.5815E−02 | 9.3063E+00  | −3.1774E+01 | 5.6748E+01  |
| R4* | −5.4838E−01 | −2.9738E−01 | 1.3360E−01  | 1.6725E+00  | −2.3704E+00 | 2.1477E+00  |
| R5* | −4.9655E+00 | −5.2364E−01 | 6.5918E−01  | −4.2795E−01 | 1.4580E−01  | −1.9958E−02 |
| R6* | −8.1455E+00 | −1.6616E−01 | 2.8668E−02  | 4.2090E−02  | −2.9240E−02 | 5.3579E−03  |

In this embodiment, the first lens L1 is made from plastic that has the refractive index $N_{d1}$ of 1.54, and the Abbe's number $v_{d1}$ of 56.1, the second lens L2 is made from plastic that has the refractive index $N_{d2}$ of 1.61 and the Abbe's number $v_{d2}$ of 26, and the third lens element L3 is made from plastic that has the refractive index $N_{d3}$ of 1.53 and the Abbe's number $V_{d3}$ of 56 while the IR cut-off filter 4 is made from BSC7 glass.

The effective focal length f of the lens is 2.8261 mm while the focal length $f_1$ of the first lens L1 is 2.8822 mm, the focal length $f_2$ of the second lens L2 is −100.0013 mm, and the focal length $f_3$ of the third lens L3 is −132.2025 mm. The inflection point on the image side 32 of the third lens L3 is positioned at 1.86 mm. That means these parameters listing in Table 9 satisfy the equation (1) to equation (7):

TABLE 9

| | |
|---|---|
| $\dfrac{bf}{TL} =$ | 0.2687 |
| $\dfrac{\Delta}{f} =$ | 0.0040 |
| $\dfrac{H_{-}}{H_{t}} =$ | 0.5314 |
| $\dfrac{f_1}{f} =$ | −0.0288 |
| $\dfrac{d_3 + d_5 + d_7 + d_9}{f} =$ | 0.4289 |

TABLE 9-continued

| | |
|---|---|
| $\dfrac{f_1}{f} =$ | 1.0199 |
| $\dfrac{R_{21} - R_{22}}{R_{21} + R_{22}} =$ | −0.0786 |

In this embodiment, the total length TL=3.5413 mm, and back focal length bf=0.95 mm. Thus, the imaging lens achieves effective aberration correction, minimum length and short back focal length.

The Fourth Embodiment

Figure 11:
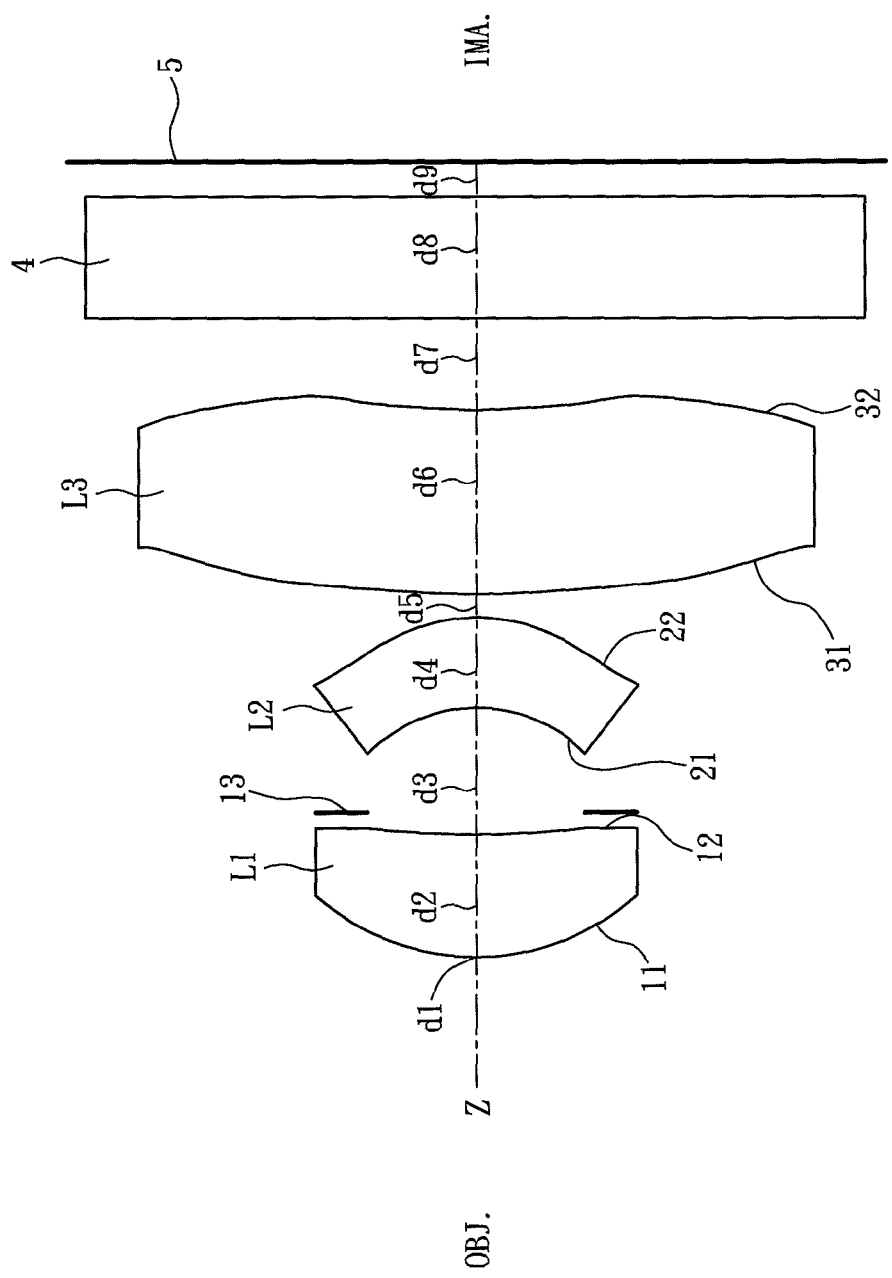
FIG. 11 is a schematic drawing of an optical structure of the fourth embodiment according to the present invention.
Figures 12, 13:
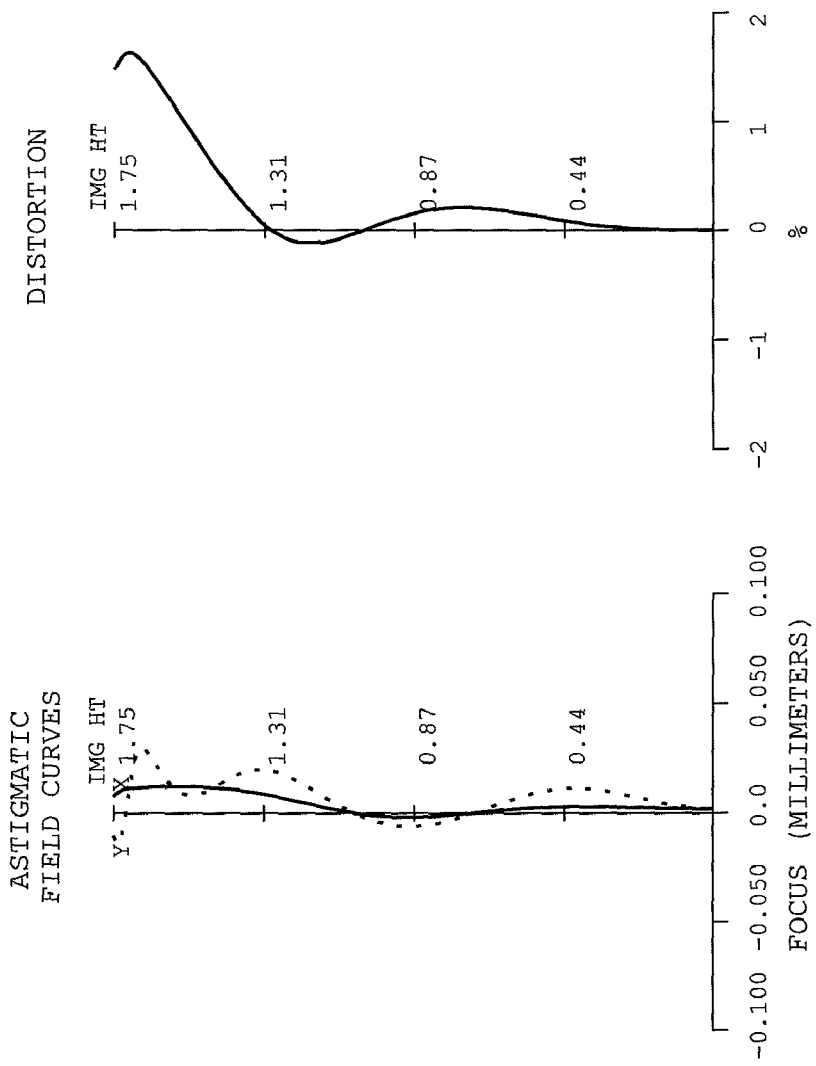
FIG. 12 shows field curvature of an image of the fourth embodiment in FIG. 11 according to the present invention.
FIG. 13 shows distortion of an image of the fourth embodiment in FIG. 11 according to the present invention.

Refer FIG. 11-13, Table 5 and Table 6, the symbols thereof are the same as those of the first embodiment.

TABLE 10

Fno = 2.8 f = 2.6249 FOV = 66.4

| Surface No. | R | d (mm) | Nd | vd |
|---|---|---|---|---|
| 1 OBJ | ∞ | 0 | | |
| 2 R1* | 1.0151 | 0.531 | 1.589 | 61.2 |
| 3 R2* | 3.4521 | 0.555 | | |
| STOP | | | | |
| 4 R3* | −0.6006 | 0.384 | 1.689 | 31.1 |
| 5 R4* | −0.7644 | 0.100 | | |
| 6 R5* | 2.8451 | 0.800 | 1.589 | 61.2 |
| 7 R6* | 2.3319 | 0.383 | | |
| 8 IR | ∞ | 0.540 | | |
| 9 | | 0.151 | | |
| 10 IMAGE | ∞ | | | |

*Aspheric

TABLE 11

|     | K           | A4          | A6          | A8          | A10         | A12         |
|-----|-------------|-------------|-------------|-------------|-------------|-------------|
| R1* | −3.1111E+00 | 3.9484E−01  | −3.8842E−01 | 1.2487E+00  | −2.5172E+00 | 1.5563E+00  |
| R2* | −1.9839E−01 | 4.6320E−01  | −4.5520E−01 | 1.1664E+00  | −9.8354E+00 | 2.6990E+01  |
| R3* | −1.0188E+00 | −1.6478E+00 | −6.4700E+00 | 5.0365E+01  | −1.4785E+02 | 1.3369E+02  |
| R4* | −1.7184E−01 | −3.3391E−01 | −6.7031E−01 | 4.8137E+00  | −4.0131E+00 | −6.8849E−01 |
| R5* | −4.8830E+00 | −1.9604E−01 | 4.1212E−01  | −3.3710E−01 | 1.3391E−01  | −2.1215E−02 |
| R6* | −3.5287E+00 | −7.1667E−01 | −7.9030E−02 | 9.9393E−02  | −3.9391E−02 | 5.4067E−03  |

In this embodiment, the first lens L1 is made from glass that has the refractive index $N_{d1}$ of 1.59, and the Abbe's number $v_{d1}$ of 61.2, the second lens L2 is made from glass that has the refractive index $N_{d2}$ of 1.69 and the Abbe's number $v_{d2}$ of 31.1, and the third lens L3 is made from glass that has the refractive index $N_{d3}$ of 1.59 and the Abbe's number $v_{d3}$ of 61.2 while the IR cut-off filter 4 is made from BSC7 glass.

The effective focal length f of the lens is 2.6249 mm while the focal length $f_1$ of the first lens L1 is 2.2536 mm, the focal length $f_2$ of the second lens L2 is −95.1835 mm, and the focal length $f_3$ of the third lens L3 is −51.9728 mm. The inflection point on the image side 32 of the third lens L3 is positioned at 1.48 mm. That means these parameters listing in Table 12 satisfy the equation (1) to equation (7):

TABLE 12

| | |
|---|---|
| $\dfrac{bf}{TL} =$ | 0.3118 |
| $\dfrac{\Delta}{f} =$ | 0.0026 |
| $\dfrac{H}{H_t} =$ | 0.4229 |
| $\dfrac{f_1}{f_2} =$ | −0.0237 |
| $\dfrac{d_3 + d_5 + d_7 + d_9}{f} =$ | 0.3068 |
| $\dfrac{f_1}{f} =$ | 0.8585 |
| $\dfrac{R_{21} - R_{22}}{R_{21} + R_{22}} =$ | −0.1200 |

In this embodiment, the total length TL=3.4426 mm, and back focal length bf=1.07 mm. Thus, the imaging lens achieves effective aberration correction, minimum length and short back focal length.

The total length of the imaging lens in this embodiment is 4.83 mm.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A miniature three-piece optical imaging lens with short back focal length, along an optical axis thereof from an object side to an image side, comprising:
    a first lens with positive refractive power that is a meniscus aspherical lens having a convex surface on the object side;
    an aperture stop;
    a second lens with negative refractive power that is a meniscus aspherical lens having a convex surface on the image side; and
    a third lens with negative refractive power on the optical axis that is an aspherical lens whose center is on the optical axis, while on the lens center the convex surface is on the object side and the concave surface is on the image side; from the center of the third lens toward the edge thereof, the refractive power changes from negative power, through an inflection point, to positive power;
    wherein the optical imaging lens satisfies conditions of:

$$0.25 \leq \frac{bf}{TL} \leq 0.4$$

$$0.001 \leq \frac{\Delta}{f} \leq 0.006$$

$$0.38 \leq \frac{H}{H_t} \leq 0.7$$

$$-0.12 \leq \frac{f_1}{f_2} \leq -0.01;$$

wherein f is effective focal length of the optical imaging lens, bf is back focal length, TL is total distance on the optical axis from the object side of the first lens to an image plane of an image sensor, Δ is the absolute value of longitudinal chromatic aberrations at Fraunhofer F curve and C curve wavelengths, H is perpendicular distance from the inflection point on the image side of the third lens to its intersection point of the optical axis, $H_t$ is perpendicular distance from the maximum optical effective point on the image side of the third lens to the optical axis, $f_1$ is effective focal length of the first lens, $f_2$ is effective focal length of the second lens.

2. The optical imaging lens as claimed in claim 1, wherein the effective focal length of the first lens and the distance on the optical axis between every two lens further satisfies conditions of:

$$0.25 \leq \frac{d_3 + d_5 + d_7 + d_9}{f} \leq 0.5$$

$$0.7 \leq \frac{f_1}{f} \leq 1.2$$

wherein f is effective focal length of the optical imaging lens, $f_1$ is effective focal length of the first lens, $d_3$ is distance on the optical axis from the image side of the first lens to the object side of the second lens, $d_5$ is distance on the optical axis from the image side of the second lens to the object side of the third lens, $d_7$ is distance on the optical axis from the image side of the third lens to the object side of an IR cut-off filter, $d_9$ is distance on the optical axis from the image side of an IR cut-off filter to the image plane of the image sensor.

3. The optical imaging lens as claimed in claim 1, wherein the second lens further satisfies an condition of:

$$-0.2 \leq \frac{R_{21} - R_{22}}{R_{21} + R_{22}} \leq -0.06$$

wherein $R_{21}$ is radius of curvature of the object side of the second lens and $R_{22}$ is radius of curvature of the image side of the second lens.

4. The optical imaging lens as claimed in claim 1, wherein the first lens, the second lens and the third lens are made from plastic.

5. The optical imaging lens as claimed in claim 1, wherein the second lens is made from glass.

6. The optical imaging lens as claimed in claim 1, wherein the first lens element and the third lens are made from glass.

* * * * *